US009465457B2

(12) United States Patent
Thompson et al.

(10) Patent No.: US 9,465,457 B2
(45) Date of Patent: Oct. 11, 2016

(54) MULTI-TOUCH INTERFACE GESTURES FOR KEYBOARD AND/OR MOUSE INPUTS

(75) Inventors: Robert Lee Thompson, San Francisco, CA (US); Xueliang Hua, Beijing (CN); Zheng Zhang, Beijing (CN); Juan Casares, Mountain View, CA (US); Wenlong Shao, Beijing (CN); Li-Zhu Zhang, Beijing (CN)

(73) Assignee: VMware, Inc., Palo Alto, CA (US)

( * ) Notice: Subject to any disclaimer, the term of this patent is extended or adjusted under 35 U.S.C. 154(b) by 780 days.

(21) Appl. No.: 12/871,639

(22) Filed: Aug. 30, 2010

(65) Prior Publication Data

US 2012/0054671 A1 Mar. 1, 2012

(51) Int. Cl.
*G06F 3/048* (2013.01)
*G06F 3/038* (2013.01)
*G06F 3/0488* (2013.01)

(52) U.S. Cl.
CPC ........... *G06F 3/038* (2013.01); *G06F 3/04883* (2013.01); *G06F 2203/0383* (2013.01); *G06F 2203/04805* (2013.01); *G06F 2203/04808* (2013.01)

(58) Field of Classification Search
CPC ....................................................... G06F 3/048
See application file for complete search history.

(56) References Cited

U.S. PATENT DOCUMENTS

| | | | | |
|---|---|---|---|---|
| 5,621,871 | A * | 4/1997 | Jaremko et al. | 345/441 |
| 6,204,845 | B1 * | 3/2001 | Bates et al. | 715/788 |
| 6,396,523 | B1 * | 5/2002 | Segal et al. | 715/863 |
| 6,791,536 | B2 * | 9/2004 | Keely et al. | 345/173 |
| 7,254,775 | B2 * | 8/2007 | Geaghan et al. | 715/701 |
| 7,730,401 | B2 * | 6/2010 | Gillespie et al. | 715/702 |
| 7,802,202 | B2 * | 9/2010 | Fox et al. | 715/831 |
| 8,754,855 | B2 * | 6/2014 | Duncan et al. | 345/173 |
| 2002/0075164 | A1 * | 6/2002 | Iizuka et al. | 340/870.16 |
| 2002/0085038 | A1 * | 7/2002 | Cobbley et al. | 345/773 |
| 2002/0089541 | A1 * | 7/2002 | Orbanes et al. | 345/764 |
| 2004/0021681 | A1 * | 2/2004 | Liao | 345/702 |

(Continued)

FOREIGN PATENT DOCUMENTS

WO  WO 2007037806 A1 *  4/2007

OTHER PUBLICATIONS

Fox, Tedd, Citrix Receiver for iPad—Demo 2—Bring up or activating the keyboard in a session, Apr. 23, 2010, p. 2.*

(Continued)

*Primary Examiner* — Ryan Pitaro (57) ABSTRACT

A computing device includes a touch screen displaying a graphical user interface (GUI) and a processing unit programmed to recognize gestures made on the touch screen and execute, in response thereto, a process associated with the gestures. The gestures include at least one of: a tap that causes an animation to be overlaid on the GUI at a location of the tap and, if a cursor is overlaid on the GUI, also causes the cursor to be moved to the location of the tap, a press-and-hold that causes a cursor overlaid on the GUI to be moved to a location of the press-and-hold, a press-and-hold in combination with a tap that causes a mouse right-click command to be executed, a press-and-hold that exceeds a predetermined amount of time in combination with a drag that causes a resizing of the GUI, a simultaneous three-tap that causes a keyboard to be launched and overlaid on the GUI to not obscure the portion of the GUI on top of which the simultaneous three-tap gesture was made, and a two-finger sweep that causes content within the GUI to be scrolled.

9 Claims, 11 Drawing Sheets

(56) References Cited

U.S. PATENT DOCUMENTS

| | | | |
|---|---|---|---|
| 2004/0260764 A1 | 12/2004 | Witchel | |
| 2005/0022130 A1* | 1/2005 | Fabritius | 715/739 |
| 2006/0085767 A1* | 4/2006 | Hinckley et al. | 715/863 |
| 2006/0129933 A1* | 6/2006 | Land et al. | 715/723 |
| 2006/0161871 A1* | 7/2006 | Hotelling et al. | 715/863 |
| 2006/0253797 A1* | 11/2006 | Madan et al. | 715/792 |
| 2007/0257891 A1* | 11/2007 | Esenther et al. | 345/173 |
| 2007/0271513 A1* | 11/2007 | Andren | 715/703 |
| 2008/0016468 A1* | 1/2008 | Chambers et al. | 715/835 |
| 2008/0062202 A1* | 3/2008 | Schulz et al. | 345/665 |
| 2009/0275406 A1* | 11/2009 | Bytnar et al. | 463/30 |
| 2009/0327975 A1 | 12/2009 | Stedman | |
| 2010/0177035 A1* | 7/2010 | Schowengerdt et al. | 345/156 |
| 2010/0235729 A1* | 9/2010 | Kocienda et al. | 715/255 |
| 2010/0235734 A1* | 9/2010 | Ording et al. | 715/702 |
| 2010/0281374 A1* | 11/2010 | Schulz et al. | 715/723 |
| 2011/0078614 A1* | 3/2011 | Lee et al. | 715/773 |
| 2011/0126135 A1* | 5/2011 | Chambers et al. | 715/763 |
| 2011/0167351 A1* | 7/2011 | Arora et al. | 715/732 |
| 2011/0234503 A1* | 9/2011 | Fitzmaurice et al. | 345/173 |
| 2011/0296333 A1* | 12/2011 | Bateman et al. | 715/773 |
| 2011/0314093 A1* | 12/2011 | Sheu et al. | 709/203 |
| 2012/0200571 A1* | 8/2012 | Newell | 345/428 |
| 2012/0242581 A1 | 9/2012 | Laubach | |
| 2012/0293440 A1* | 11/2012 | Hotelling et al. | 345/173 |
| 2013/0212541 A1* | 8/2013 | Dolenc et al. | 715/863 |

OTHER PUBLICATIONS

Non-Final Office Action dated Aug. 13, 2015, U.S. Appl. No. 13/362,854, filed Jan. 31, 2012, 16 pages.

* cited by examiner

MULTI-TOUCH INTERFACE GESTURES FOR KEYBOARD AND/OR MOUSE INPUTS

BACKGROUND

Remote desktop connection applications allow a user of a "remote" machine to control a particular "host" machine. This is commonly referred to as a "remoting" session. Typically, the remote machine comprises input/output (IO) hardware that is similar to that of the host machine, such as a keyboard, a mouse, and a monitor. Throughout a remoting session, the video output data at the host machine is routed to the remote machine, where such video data often includes a user interface (UI) of an operating system executing on the host machine. Conversely, user input data received at the remote machine is routed to the host machine, where the host machine interprets the routed input data as if the input data was received locally at the host machine. For example, a user of a remote machine could select, using a mouse of the remote machine, an executable (.exe) file of a software program located in a folder that is displayed within the UI of the host machine. In this example, the mouse input is routed from the remote machine to the host machine, where the mouse input causes the host machine to execute the selected software program. Then, the host machine routes new video data (which displays a UI of the executed software program) back to the remote machine.

Presently, user interfaces (UIs) for software programs are predominantly designed to include UI elements that are easily selectable using mouse and/or keyboard input devices. However, the evolution of computer hardware has introduced several new input devices, including capacitive multi-touch surfaces seen on smartphones and tablet personal computers (PCs). Though these multi-touch surfaces are favorable in many aspects when interacting with multi-touch based UIs (which include large UI elements that are easy to select using one or more fingertips), the same does not apply when interacting with mouse-and-keyboard based UIs.

For example, if a user of a tablet PC connects to a host machine the user navigates the UI by dragging or tapping his or her finger on the multi-touch surface of the tablet PC. As is well-known, a mouse click specifies a particular (x,y) coordinate of the UI on which a cursor associated with the mouse currently lies. In contrast, tapping a finger to a multi-touch surface specifies a plurality of (x,y) coordinates of the UI on which the tap is placed. Thus, to operate a mouse using a finger, approximation of the plurality of (x,y) coordinates into a single (x,y) coordinate is continually required. These approximations lead to frequent input inaccuracies, thereby reducing the overall productivity of the user when conducting remoting sessions.

Several modifications in UI design have been attempted to increase the accuracy of input when conducting remoting sessions. For example, the ability to zoom-in and zoom-out on a UI allows a user to interact more efficiently with any small interface elements included therein. However, these UI techniques require that the user continually zooms-in and zooms-out on the UI, which is time-consuming and leads to a cumbersome remoting experience. Furthermore, the native gesturing that is recognized by tablet PC devices cannot simply be transferred to the host machine as the host machine is not configured to process multi-touch input.

SUMMARY

One or more embodiments of the present invention provide enhanced techniques for interacting with a mouse-and-keyboard based UI using a multi-touch surface. It should be recognized that embodiments of the present invention are applicable to any computing environment where a user employs a multi-touch surface to interact with mouse-and-keyboard based UIs, such as a virtual machine running on a tablet PC with a guest operating system that employs mouse-and-keyboard based UIs and a remoting session where the remote server employs mouse-and-keyboard based UIs.

A computing device, according to an embodiment of the present invention, comprises a touch screen displaying a graphical user interface (GUI) and a processing unit programmed to recognize gestures made on the touch screen and execute, in response thereto, a process associated with the gestures. The gestures include at least one of the following: a tap that causes an animation to be overlaid on the GUI at a location of the tap and, if a cursor is overlaid on the GUI, also causes the cursor to be moved to the location of the tap; a press-and-hold that causes a cursor overlaid on the GUI to be moved to a location of the press-and-hold; a press-and-hold in combination with a tap that causes a mouse right-click command to be executed; a press-and-hold that exceeds a predetermined amount of time in combination with a drag that causes a resizing of the GUI; a simultaneous three-tap that causes a keyboard to be launched and overlaid on the GUI to not obscure the portion of the GUI on top of which the simultaneous three-tap gesture was made; and a two-finger sweep that causes content within the GUI to be scrolled.

A computing device, according to another embodiment of the present invention, comprising a touch screen displaying a graphical user interface (GUI), a cursor overlaid on the GUI, a virtual touch pad, and a processing unit programmed to recognize gestures made on the touch screen and execute, in response thereto, a process associated with the gestures. The gestures made on top of virtual touch pad are used to control movements of the cursor within the GUI.

Further embodiments of the present invention include a computing device having a touch screen that interacts with a server for a remoting session. During this session, an image of a user interface generated by the server is displayed on the touch screen and gestures made on the touch screen are processed locally by the computing device.

One or more embodiments of the present invention also provide a multi-display system comprising a first display unit, and a second display unit coupled to the first display unit to supply display signals to the first display unit, the second display unit including a touch screen and a processing unit programmed to recognize gestures made on the touch screen and execute a process associated with the gestures to launch UI elements to be displayed on the touch screen of the second display unit but not on the first display unit.

DETAILED DESCRIPTION

In the following description, numerous specific details are set forth in order to provide a thorough understanding of the present invention. However, it will be apparent to one skilled in the art that the present invention may be practiced without some of these specific details. In other instances, well known process operations and implementation details have not been described in detail in order to avoid unnecessarily obscuring the invention.

Figure 1:
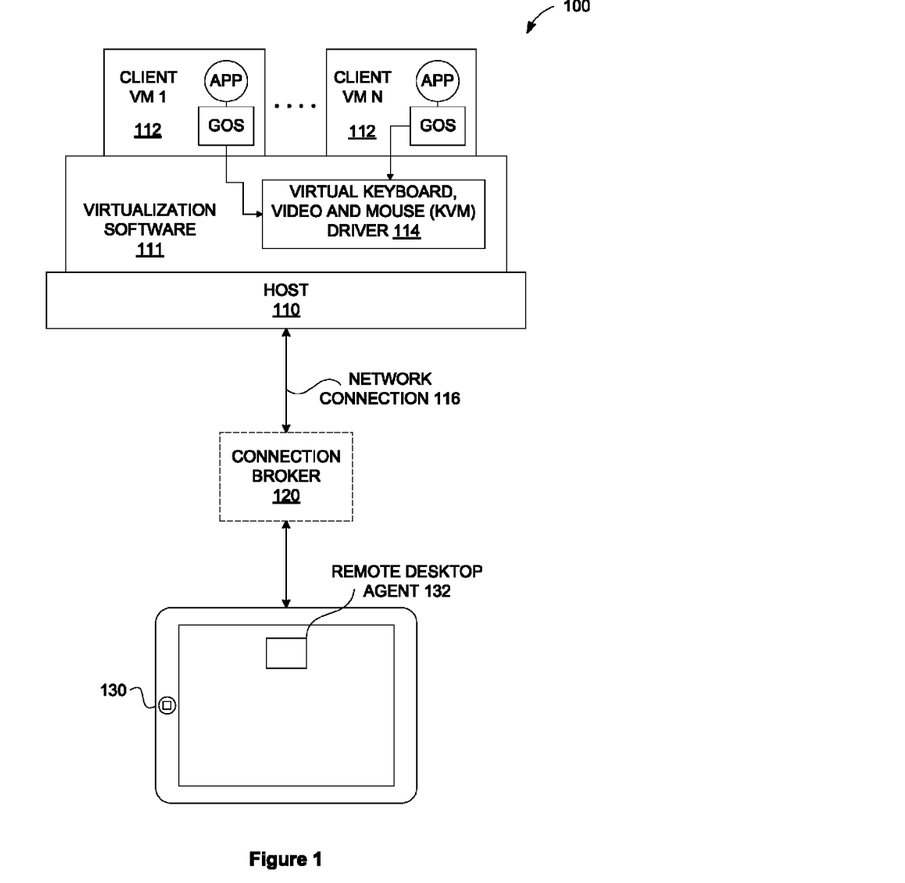
FIG. 1 is a conceptual diagram 100 of a remoting session that shows by way of example a host machine connected through a network to a remote machine.

FIG. 1 is a conceptual diagram 100 of a remoting session that shows by way of example a host machine 110 connected through a network 116 to a remote machine 130, according to one or more embodiments of the present invention. The host machine 110 may comprise a general purpose computer system having one or more applications, virtual machines, or other entities. In one embodiment, the host machine 110 comprises a virtualized computer system wherein each client 112 is a virtual machine (VM) implemented by virtualization software 111, or a component thereof. Virtualization software 111 may be implemented as one or more layers of software logically interposed between and interfacing with clients 112 as physical hardware of host machine 110. In one embodiment, virtualization software 111 comprises a virtualization kernel (not shown) for managing physical resources and a virtual machine monitor (VMM) (not shown) for each client 112 for emulating virtual hardware and devices with which software within client 112 interacts. In another embodiment, virtualization software includes a host operating system (not shown) for managing physical resources. These other virtualization configurations are well known in the field of computer virtualization. Any number N of clients 112 may execute concurrently on host machine 110 using virtualization software 111, the number N being limited only by physical resources such as memory and processing bandwidth. A virtual keyboard, video and mouse (KVM) driver 114 receives keyboard, video and mouse input from each of the N clients 112 that are executing concurrently on host machine 110. Virtual KVM driver 114 transmits the received input to underlying hardware included in host machine 110 that interprets the input as if it was made by physical input devices directly connected to host machine 110, such as a universal serial bus (USB) keyboard and/or mouse.

Each VM may include a guest operating system (GOS) and one or more applications (APP). The guest operating systems may be a commodity operating system such as Microsoft Windows® or a specialized operating system designed specifically to work with virtualization software 111 (sometimes referred to as a "paravirtualized OS"). In one embodiment, virtualization software 111 resides on a physical data storage medium (not shown) forming part of host machine 110, whereas virtual disks (not shown) for each client virtual machine are mapped by virtualization software 111 to files that reside remotely or locally.

Network 116 may be any of a wide area network, a local area network, a wireless network, or the like. Remote machine 130 communicates with host machine 110 using the network 116 such that IO data may be communicated between remote machine 130 and host machine 110. An optional connection broker 120 may be disposed between remote machine 130 and host machine 110 to, for example, facilitate enhanced security features and/or provide customized connectivity options.

In the embodiments of the present invention described herein, remote machine 130 executes a remote desktop agent 132 that is configured to facilitate a remoting session with host machine 110. Throughout the remoting session, remote machine 130 receives video output data from host machine 110 and displays the video output data to a user of remote machine 130. Input data is collected at remote machine 130 and transmitted host machine 110. Upon receipt, host machine 110 processes the input data and responds accordingly.

Various techniques to effectively interact with a mouse-and-keyboard based UI using a multi-touch surface are described herein. For purposes of illustration, in each of the examples described below in conjunction with FIGS. 2-9, the system of FIG. 1 in which remote machine 130 has established a remoting session with a client VM 112 executing within host machine 110 is employed.

Figure 2:
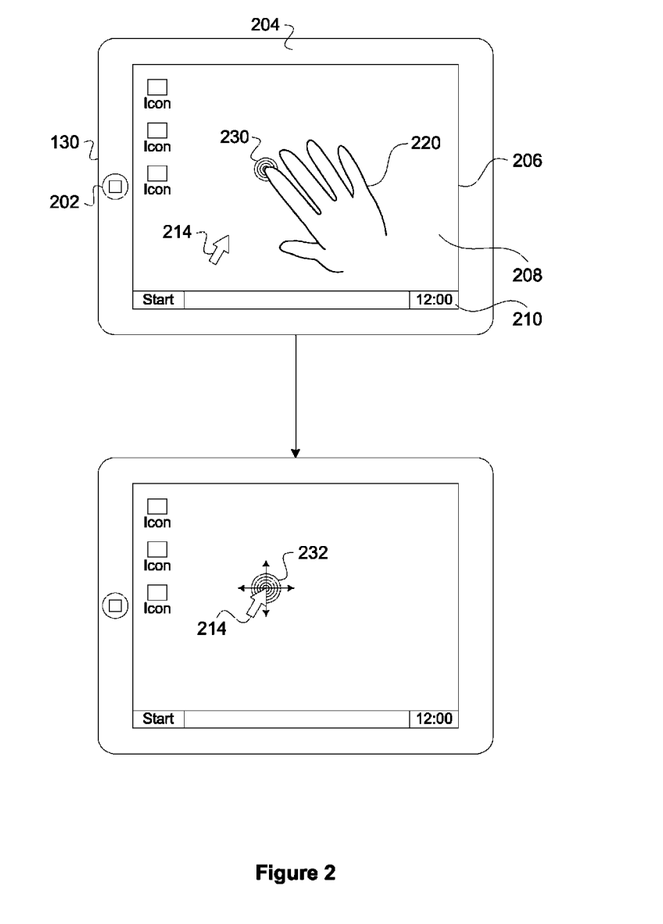
FIG. 2 is a conceptual diagram of a method for enhancing the feedback of a mouse click made using a multi-touch surface, according to one embodiment of the invention.

FIG. 2 is a conceptual diagram of a method for enhancing the feedback of a mouse click made using a multi-touch surface, according to an embodiment of the present invention. As shown, remote machine 130 includes a physical button 202, a border area 204 and a multi-touch surface 206. Physical button 202 may be used as a power control button for remote machine 130. Border area 204 provides a separation between edges of remote machine 130 and multi-touch surface 206 so that, when remote machine 130 is held by a user, his or her hands do not mistakenly establish contact with multi-touch surface 206. Multi-touch surface 206 displays a UI 208 of an operating system executing on host machine 110, which includes a cursor 214.

A hand 220 of the user that interacts with remote machine 130 is also shown. Hand 220 may be used to establish contact with multi-touch surface 206, as depicted by a tap 230 made by using the index finger of hand 220. In the embodiments described herein, a tap 230 comprises establishing contact between a single finger of hand 220 and multi-touch surface 206, and then eliminating the contact within a predetermined threshold of time. For example, in a particular configuration, if the user presses his or her finger to the multi-touch surface 206 for half a second, and immediately releases his or her finger thereafter, then a tap 230 is established. When a tap 230 occurs, cursor 214 is relocated to the area of multi-touch surface 206 at which tap 230 occurs. Thus, the finger that established tap 230 covers cursor 214, preventing the user from effectively determining whether the mouse relocation has occurred.

To cure this deficiency, a tap feedback animation 232, in response to tap 230, is displayed to the user. In one embodiment, tap feedback animation 232 displays a "pulse" animation that exudes circles of light. However, any animation technique known to those in the art may be used. Tap feedback mechanism 232 is overlaid, by remote machine 130, onto UI 208, such that video output data transmitted from host machine 110 does not include tap feedback mechanism 232. Thus, tap feedback mechanism 232—along with additional remote machine 130-based UI elements described herein—may be customized independent to host machine 110.

Advantageously, tap feedback mechanism 232 assists in communicating to the user that his or her tap 230 is acknowledged by remote machine 130 and/or host machine 110, which eliminates a typical necessity for the user to closely review the UI 208 to determine whether his or her input was effectively processed by remote machine 130 and/or host machine 110.

Cursor 214 is displayed, for example, when a virtual touch pad, which is described below, is overlaid onto UI 208. In some embodiments, cursor 214 is not displayed. In such embodiments, a tap feedback animation 232, in response to tap 230, is displayed to the user to indicate to the user the location of his or her tap 230 and that his or her tap 230 is acknowledged by remote machine 130 and/or host machine 110.

Figure 3:
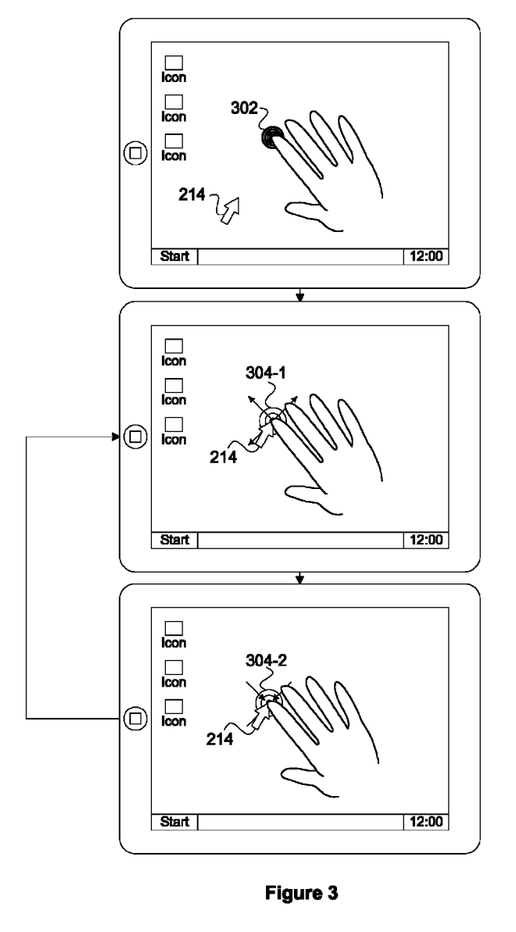
FIG. 3 is a conceptual diagram of a method for enhancing the feedback of a mouse left-click-and-hold made using a multi-touch surface, according to one embodiment of the invention.

FIG. 3 is a conceptual diagram of a method for enhancing the feedback of a mouse left-click-and-hold made using a multi-touch surface, according to one embodiment of the present invention. As shown, a press-and-hold 302 is established by the user of remote machine 130. In one embodiment, remote machine 130 identifies a press-and-hold 302 when a tap 230 exceeds the predetermined threshold of time as described above in conjunction with FIG. 2.

Upon identification of press-and-hold 302, cursor 214 is relocated to the area of UI 208 at which press and hold 302 occurs, whereupon a first portion of press-and-hold feedback animation 304 is displayed to the user. After a predetermined amount of time has elapsed, a second portion of press-and-hold feedback animation 304 is displayed to the user. In one embodiment, the first portion of press-and-hold feedback animation 304 displays outward-directed, glowing pulses of light (illustrated in FIG. 3 as outward arrows), while the second portion of press-and-hold feedback animation 304 displays inward-directed, glowing pulses of light (illustrated in FIG. 3 as inward arrows). The press-and-hold feedback animation 304 repeats as long as press-and-hold 302 is maintained by the user. The user may terminate the press-and-hold 302 by releasing his or her finger from multi-touch surface 206. Thus, press-and-hold feedback animation 304 effectively communicates to the user that his or her press-and-hold 302 to the multi-touch surface 206 is being continually processed by remote machine 130 and/or host machine 110. The user may terminate the press-and-hold 302 by releasing his or her finger from the multi-touch surface 206.

Figure 4:
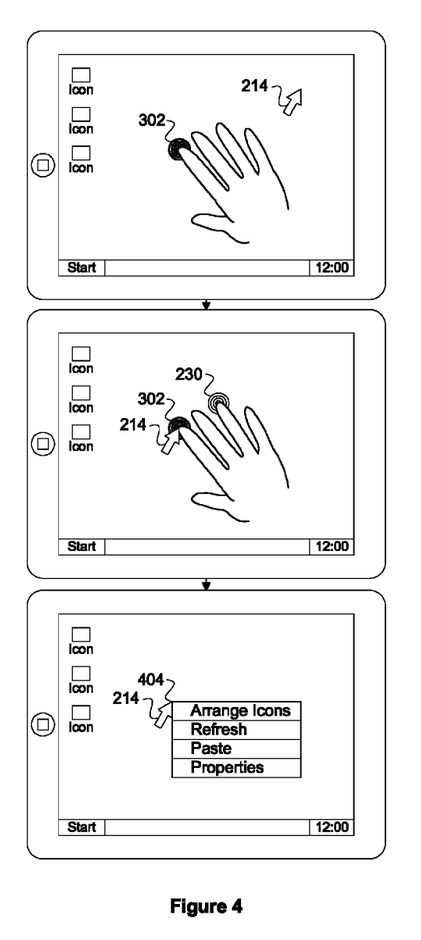
FIG. 4 is a conceptual diagram of a method for establishing a mouse right-click using a multi-touch surface, according to one embodiment of the invention.

FIG. 4 is a conceptual diagram of a method for establishing a mouse right-click using a multi-touch surface, according to one embodiment of the present invention. As shown, a press-and-hold 302 is established by the user of remote machine 130. Next, while maintaining press-and-hold 302, the user establishes a tap 230 at an area nearby the location of press-and-hold 302. When remote machine 130 recognizes the tap 230 while press-and-hold 302 is maintained, a mouse right-click command is directed from remote machine 130 to host machine 110, as depicted by a context menu 404 that is subsequently displayed at the location of cursor 214 where press-and-hold 302 was established.

In an alternative embodiment, the user may perform a right-click command by establishing a first tap and a second tap within a predetermined threshold of time and at an offset that exceeds a predetermined threshold of distance. The predetermined threshold of time may be selected as a maximum of a one second delay between the first tap and the second tap. If the user establishes a first tap, but waits two seconds to perform the second tap, the cursor 214 is simply relocated twice, and no mouse right-click command is recognized by remote machine 130 and/or host machine 110. If, however, the user establishes the first tap and the second tap within one second, the second tap is translated by remote machine 130 into a mouse right-click command that is established at the position within UI 208 at which the first tap occurred.

The predetermined threshold of distance is necessary to differentiate a mouse double-click and a mouse right-click. In one example, the minimum distance may be twenty pixels. More specifically, if the first tap and the second tap are recognized within the predetermined threshold of time, but are close in proximity (less than the threshold distance), a mouse double-click would be recognized instead of a mouse right-click. However, if the first tap and the second tap are recognized within the predetermined threshold of time, and are offset from one another by at least the threshold distance, a mouse right-click would be recognized as opposed to a mouse double-click.

Figure 5A:
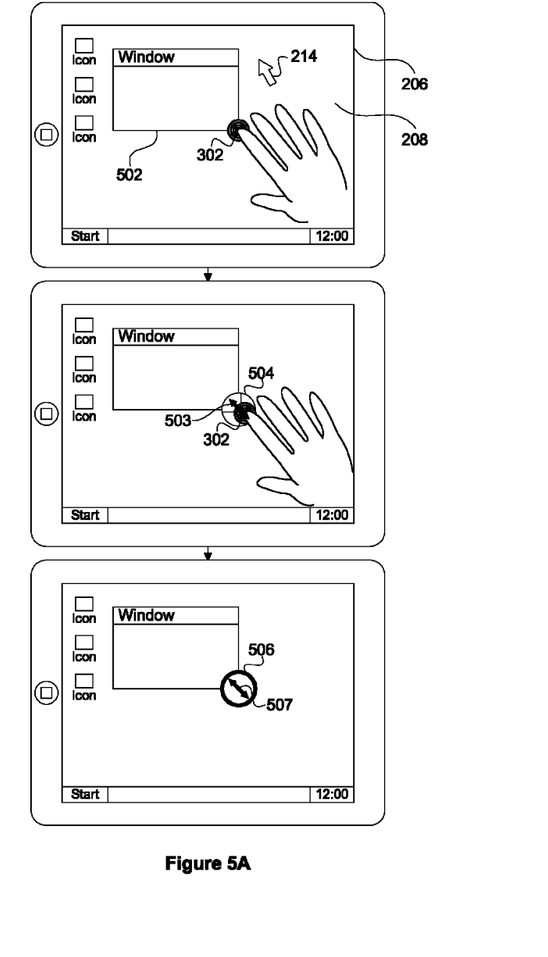
FIGS. 5A and 5B are conceptual diagrams of a method for resizing a UI window using a multi-touch surface, according to one embodiment of the invention.
Figure 5B:
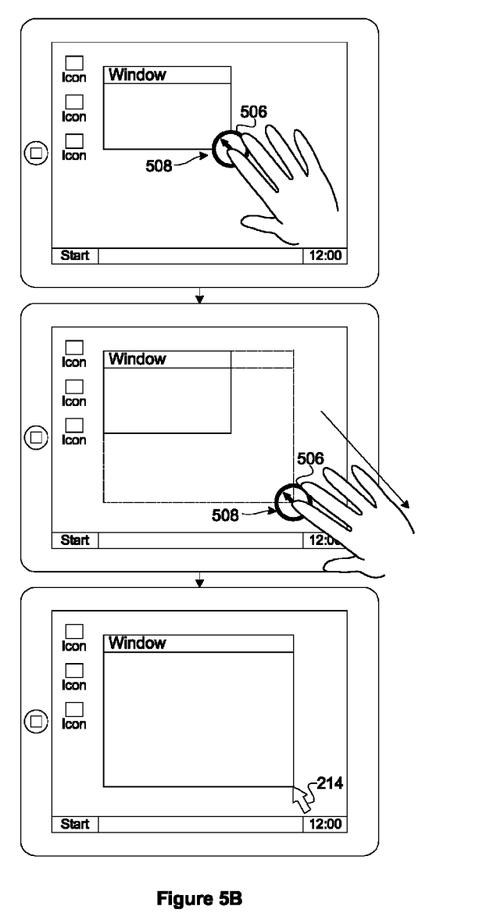

FIGS. 5A and 5B are conceptual diagrams of a method for resizing a UI window using a multi-touch surface, according to one embodiment of the present invention. As shown, UI 208 includes a UI window 502 that is resizable by dragging a resize handle, which may be located at any corner or side of UI window 502. To resize UI window 502 using multi-touch surface 206, the user begins by establishing a press-and-hold 302. As described above in FIG. 3, press-and-hold 302 causes a relocation of cursor 214, whereupon press-and-hold feedback animation is displayed in the same area of UI 208 to which cursor 214 is relocated. However, if press-and-hold 302 remains established beyond a particular threshold of time, then a loupe 504—which magnifies an area of UI 208 that the loupe 504 currently covers—is displayed to the user. As shown, since the loupe 504— which, when moved by the user, correspondingly moves cursor 214—is displayed over a resize handle of UI window 502, cursor 214 is replaced by a resize tool 503.

A resize handle 506 replaces loupe 504 when the user eliminates press-and-hold 302 while loupe 504 is displayed. Resize handle 506 represents a mouse left-click that is held on an (x,y) coordinate of UI 208 that lies beneath centerpoint 507 of resize handle 506. Thus, in FIG. 5A, resize handle 506 indicates that UI window 502 is ready for resizing. In addition, the user may cancel resize handle 506 by establishing contact with any portion of UI 208 that does not fall within the boundaries of resize handle 506.

Next, the user establishes a grab 508 by placing a single finger within the boundaries of resize handle 506. Grab 508 is similar to a press-and-hold 302 in that the user is required to continually maintain contact with multi-touch surface 206. When grab 508 is established, the user is permitted to drag resize handle 506 anywhere within the boundaries of UI 208. Again, since resize handle 506 represents a mouse left-click press-and-hold, movement of resize handle 506 correspondingly resizes UI window 502. When the user is satisfied with the resulting size of UI window 502, he or she simply releases their finger from the screen, whereupon resize handle 506 is removed, and cursor 214 is reestablished at the position at which the resize ended.

Figure 6:
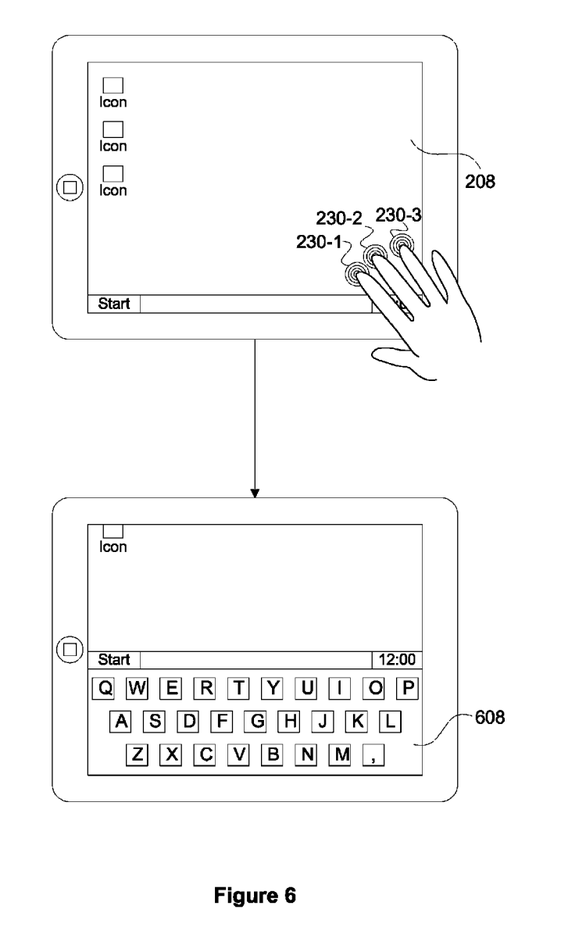
FIG. 6 is a conceptual diagram of a method for maintaining visibility of a UI when auxiliary UI elements are overlaid onto the UI, according to one embodiment of the present invention.

FIG. 6 is a conceptual diagram of a method for maintaining visibility of a UI when auxiliary UI elements are overlaid onto the UI, according to one embodiment of the present invention. If the user simultaneously establishes three taps 230, a virtual keyboard 608 is launched and overlaid onto UI 208. As a way to maintain visibility of UI 208 when the three taps 230 are established, UI 208 is offset so that keyboard 608 does not, in any way, overlap UI 208. Such a configuration is useful when, for example, the user taps a portion of UI 208 to provide text entry. Further, virtual keyboard 608 may be configured to appear at different portions of UI 208, such as the left border, and UI 208 is offset accordingly.

Figure 7:
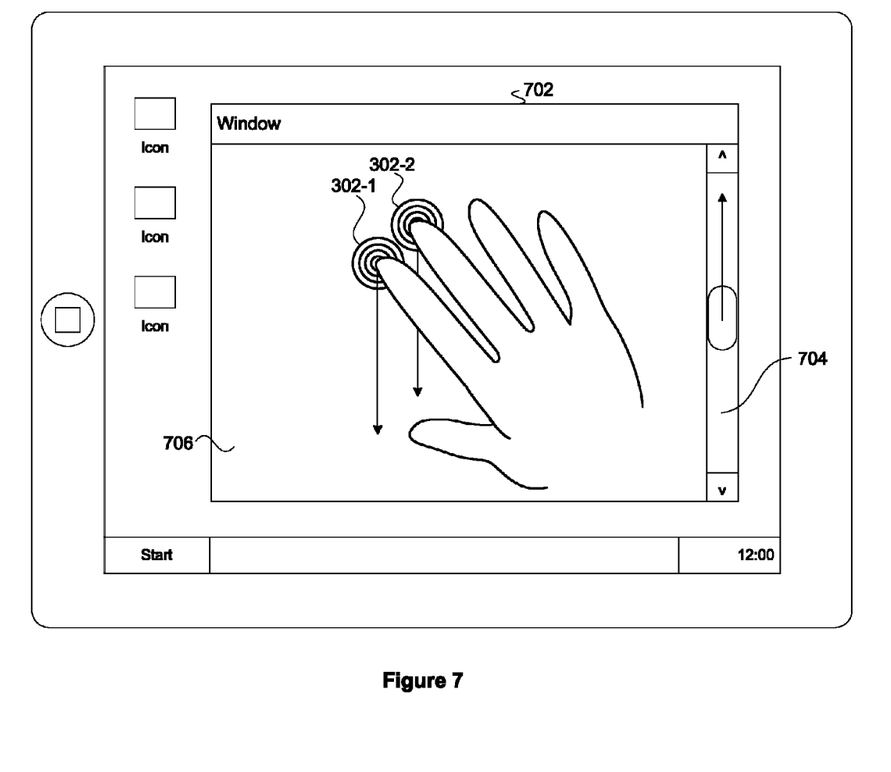
FIG. 7 is a conceptual diagram of a method for scrolling content of a UI window using a multi-touch surface 206, according to one embodiment of the present invention.

FIG. 7 is a conceptual diagram of a method for scrolling content of a UI window using a multi-touch surface 206, according to one embodiment of the invention. As shown, a UI window 702 is displayed within UI 208 and includes a scroll bar 704, as known to those skilled in the art. Here, remote machine 130 is configured to initiate a scroll when two press-and-holds 302 are detected within an area of UI 208 that is scrollable —such as UI window area 706. Remote machine 130 tracks any movement of press-and-holds 302 and correspondingly scrolls content displayed in UI window 702. The remote machine 130 may be configured to scroll content upwards when press-and-holds 302 move downward across multi-touch surface 206, or vice-versa. To provide the scrolling technique described herein, the press-and-holds 302 are received by remote 130 and translated into mouse scroll-up or mouse scroll-down commands, and routed to host machine 110 for processing.

Figure 8:
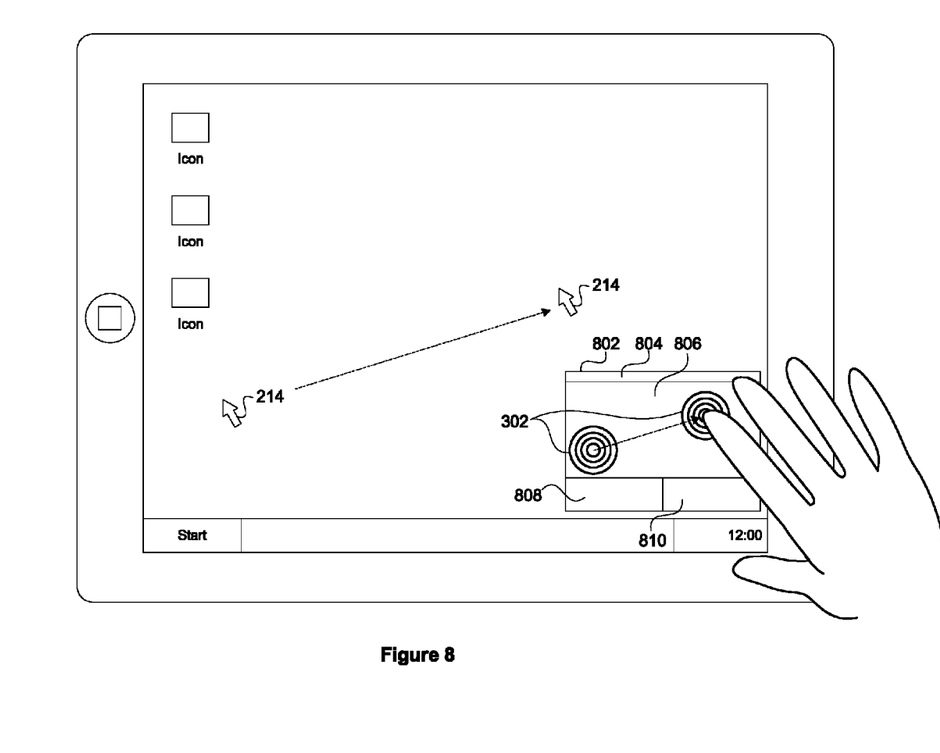
FIG. 8 is a conceptual diagram of a method for controlling a mouse using a virtual touch pad, according to one embodiment of the present invention.

FIG. 8 is a conceptual diagram of a method for controlling a mouse using a virtual touch pad, according to one embodiment of the invention. As shown, remote machine 130 overlays a virtual touch pad 802 onto UI 208, where virtual touch pad 802 comprises a move handle 804, a touch area 806, a mouse left-click button 808, and a mouse right-click button 810. Virtual touch pad 802 may be configured to be semi-transparent so that any portion of UI 208 that lies beneath virtual touch pad 802 is not obstructed to the user. Handle 804 enables the user to adjust the location of virtual touch pad 802 within multi-touch surface 206. For example, the user may establish a press-and-hold 302 within the boundaries of handle 804 and, while maintaining contact with multi-touch surface 206, drag his or her finger to relocate handle 804.

Touch area 806 may be used to control the location of cursor 214 within UI 208. For example, if the user establishes a press-and-hold 302 within the boundaries of touch area 806 and, while maintaining contact with multi-touch surface 206, drags his or her finger from left-to-right across touch area 806, cursor 214 is relocated in a similar fashion, as depicted. To enhance the operability of virtual touch pad 802, acceleration of movement across touch area 806 may be considered by remote machine 130. More specifically, the user may increase the rate of movement of cursor 214 by, for example, flicking his or her finger across touch area 806. In addition, touch area 806 may be configured to recognize taps 230 as mouse clicks.

Mouse left-click button 808 and mouse right-click button 810 may be used to perform mouse left-clicks and mouse right-clicks, respectively. For example, to perform a mouse left-click, the user would establish a tap 230 within the boundaries of mouse left-click button 808. Similarly, to perform a mouse right click, the user would establish a tap 230 within the boundaries of mouse right-click button 810. Mouse left-click button 808 and mouse right-click button 810 may also be reversed to provide operability to, for example, left-handed mouse users.

Figure 9:
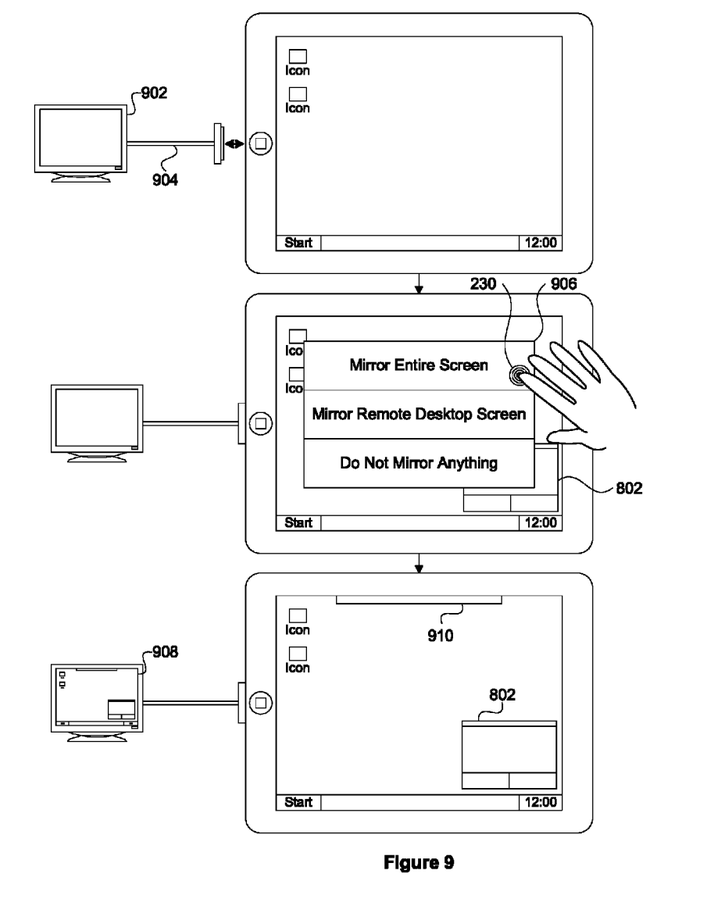
FIG. 9 is a conceptual diagram of a method for controlling video output of a remoting session to an external monitor, according to one embodiment of the invention.

FIG. 9 is a conceptual diagram of a method for controlling video output of a remoting session to an external monitor, according to one embodiment of the invention. As-shown, a display device 902 and a display cable 904 are initially detached from remote machine 130. Display device 902 may be any type of display device known to those in the art, such as a liquid crystal display (LCD) monitor, projector, plasma screen, or the like. Display cable 904 may be any type of display cable known to those in the art, such as a video graphics array (VGA) cable, digital visual interface (DVI) cable, high definition media interface (HDMI) cable, or the like, where one end of display cable 904 is compatible with an input to display device 902 and an opposing end is compatible with an output of remote machine 130.

Remote machine 130 is configured to automatically detect when display cable 904 is connected to remote machine 130. In response to the connection, remote machine 130 automatically displays a preferences menu 906 within UI 208, which enables the user to select a video output setting for the current remoting session including, but not limited to "minor entire screen," "mirror remote desktop screen," and "do not mirror anything." If the user selects "minor entire screen," then remote machine 130 displays UI 208 and any UI elements that are overlaid onto the UI 208 by remote machine 130—such as press-and-hold animations 304. If the user selects "mirror remote desktop screen," then remote machine 130 only displays UI 208 on display device 902, and hides any such overlaid UI elements. Or, the user may opt to prevent display device 902 from displaying any video output data by selecting "do not minor anything," which is useful when, for example, the user is preparing to display a presentation using UI 208 on display 902.

In the example shown in FIG. 9, the user selects the "minor entire screen" output setting by establishing a tap 230 over the corresponding UI element included in preferences menu 906. In turn, display device 902 displays UI 908 which, as shown, includes UI elements overlaid onto UI 208 by remote machine 130, such as virtual touch pad 802.

Upon selection of a video output setting included in preferences menu 906, remote machine 130 shrinks preferences menu 906 into a hidden menu 910. To perform a subsequent modification of the video output settings, the user simply performs a tap 230 within the boundaries of hidden menu 910 to display the preferences menu 906, whereupon he or she may select another video output setting.

Figure 10:
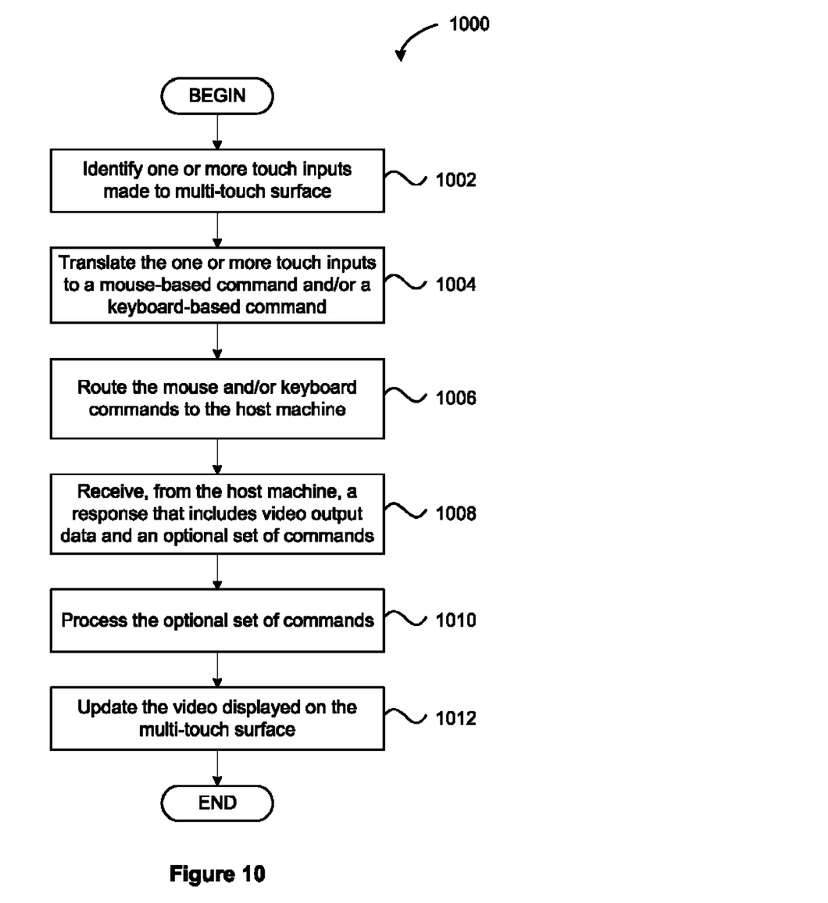
FIG. 10 is a flow diagram of method steps 1000 for transmitting and receiving remoting data between a multi-touch based remote machine and a mouse-and-keyboard based host machine, according to one embodiment of the present invention.

FIG. 10 is a flow diagram of method steps 1000 for transmitting and receiving remoting data between a multi-touch based remote machine and a mouse-and-keyboard based host machine, according to one embodiment of the present invention. Although the method steps are described in conjunction with the systems for FIGS. 1-9, persons skilled in the art will understand that any system configured to perform the method steps, in any order, is within the scope of the invention.

The method 1000 begins at step 1002, where remote machine 130 identifies one or more touch inputs made to multi-touch surface 206.

At step 1004, remote machine 130 translates the one or more touch inputs to a mouse-based command and/or a keyboard-based command. In one embodiment, remote machine 130 maintains a database that includes one or more predefined touch inputs, each with a corresponding mouse-based command and/or keyboard based command. For example, a two touch inputs that imply a mouse right-click, as described above in FIG. 3, would correspond to a mouse-right click command. In another example, two press-and-hold touch inputs that move in a downward direction would correspond to a mouse wheel scroll-down command.

At step 1006, remote machine 130 routes the mouse and/or keyboard commands to the host machine 110. As described herein, remote machine 130 communicates with host machine 110 using network 116, and may route such mouse and/or keyboard commands by including each in network packets that are addressed to host machine 110.

At step 1008, remote machine 130 receives, from host machine 110, a response that includes video output data and an optional set of commands. In one embodiment, host machine 110 is configured to only output video data only when UI 208 is updated, thereby reducing the amount of data transmitted over network 116 and resultantly increasing bandwidth.

At step 1010, remote machine 130 processes the optional set of commands. In one embodiment, the optional set of commands cause remote machine 130 to perform specific tasks. For example, host machine 110 could identify that the user selects a text input field located in a window UI included in UI 208 and include this information in the optional set of commands. Upon receipt of the optional set of commands, remote 130 would automatically initialize and display virtual keyboard 608 so that the user could easily provide textual input to the text input field.

At step 1012, remote machine 130 updates the video displayed on multi-touch surface 206. In the example described above in step 1010, remote machine 130 would configure multi-touch surface to display virtual keyboard 608 overlaid onto a most up-to-date UI 208.

As described herein, the method 1000 enables remoting sessions between remote machine 130 and host machine 110 to be highly configurable in order to support enhanced multi-touch based input to a mouse-and-keyboard based UI. The aforementioned database may be updated to support new gestures that perform particular mouse and/or keyboard based commands. In addition, the optional set of commands may be enhanced to reduce input requirements at the remote 130, thereby increasing the productivity of the remoting session and providing a better overall experience to the user.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments, may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

We claim:

1. A computing device comprising:
a touch screen displaying a graphical user interface (GUI); and a processing unit programmed to recognize gestures made on the touch screen and execute, in response thereto, a process associated with the gestures, wherein the gestures include:

a press-and-hold that exceeds a predetermined amount of time, an elimination of the press-and-hold, and an establishment of a grab within a resize handle of a window of the GUI and a drag that causes a resizing of the window, wherein the press-and-hold causes a first portion of animation to be displayed and, after the predetermined amount of time, a loupe and a second portion of animation to be displayed, and wherein the elimination of the press-and-hold while the loupe is displayed over the resize handle causes a resize tool to replace the loupe.

2. The device of claim 1, wherein the first portion of animation is a pulse animation.

3. The device of claim 1, wherein the touch screen further displays a virtual touch pad for controlling a cursor that is overlaid on the GUI.

4. A client computing device interacting with a server for a remoting session, comprising:

a touch screen displaying an image of a user interface generated by the server; and a processing unit programmed to recognize gestures made on the touch screen and execute, in response thereto, a process associated with the gestures that is executed locally on the client and not at the server, wherein the gestures include:

a press-and-hold that exceeds a predetermined amount of time, an elimination of the press-and-hold, and an establishment of a grab within a resize handle of a window of the GUI and a drag that causes a resizing of the window, wherein the press-and-hold causes a first portion of animation to be displayed and, after the predetermined amount of time, a loupe and a second portion of animation to be displayed, and wherein the elimination of the press-and-hold while the loupe is displayed over the resize handle causes a resize tool to replace the loupe.

5. The device of claim 4, wherein the gestures are made within boundaries of the image.

6. The device of claim 4, wherein the animation is a pulse animation.

7. A method for recognizing a gesture on a touch screen, comprising:

displaying an image of a graphical user interface (GUI) on the touch screen;

recognizing, with a processing unit, a gesture made on the touch screen; and executing a process associated with the recognized gesture, wherein the gestures include:

a press-and-hold that exceeds a predetermined amount of time, an elimination of the press-and-hold, and an establishment of a grab within a resize handle of a window of the GUI and a drag that causes a resizing of the window, wherein the press-and-hold causes a first portion of animation to be displayed and, after the predetermined amount of time, a loupe and a second portion of animation to be displayed, and wherein the elimination of the press-and-hold while the loupe is displayed over the resize handle causes a resize tool to replace the loupe.

8. The method of claim 7, wherein the animation is a pulse animation.

9. The method of claim 7, wherein the touch screen further displays a virtual touch pad for controlling a cursor that is overlaid on the GUI.

* * * * *